(12) United States Patent  (10) Patent No.: US 8,286,739 B2
Oliphant  (45) Date of Patent: Oct. 16, 2012

(54) SELF-PROPELLED BEACH CART

(76) Inventor: John Oliphant, Virginia Beach, VA (US)

( * ) Notice: Subject to any disclaimer, the term of this patent is extended or adjusted under 35 U.S.C. 154(b) by 0 days.

(21) Appl. No.: 12/930,216

(22) Filed: Dec. 30, 2010

(65) Prior Publication Data

US 2012/0168237 A1 Jul. 5, 2012

(51) Int. Cl.
B60K 1/02 (2006.01)
(52) U.S. Cl. ........................................ 180/65.1
(58) Field of Classification Search .............. 280/651, 280/47.11, 47.34, 47.371, 47.41; 180/65.1
See application file for complete search history.

(56) References Cited

U.S. PATENT DOCUMENTS

| 7,669,881 B2* | 3/2010 | Haury et al. | 280/649 |
| 7,762,363 B1* | 7/2010 | Hirschfeld | 180/65.1 |
| 2008/0041644 A1* | 2/2008 | Tudek et al. | 180/65.1 |

* cited by examiner

Primary Examiner — John Walters
Assistant Examiner — James Triggs
(74) Attorney, Agent, or Firm — Bradley Goldizen

(57) ABSTRACT

A motorized beach cart includes a storage area mounted atop a chassis having a plurality of axles. A motor having a corresponding hand actuated accelerator arranged on a handle of the beach cart drives one of the axles to propel the beach cart in a forward or backward direction according to a selector switch. A power source such as a battery is coupled to the motor through the accelerator for delivering a desired amount of energy to the motor to propel it in a desired direction and speed. The beach cart may include a solar cell for recharging the power source used to drive the motor.

15 Claims, 4 Drawing Sheets

SELF-PROPELLED BEACH CART

There are no related patent applications.

The present application did not received federal research and/or development funding.

TECHNICAL FIELD

Generally, the present invention relates to a motorized beach cart in which beach items may be maintained and transported. More particularly, the present invention is a self-propelled, mobile beach cart apparatus that includes a pair of drive mechanisms which drive the beach cart in a forward or reverse direction. The beach cart is useful in transporting chairs, coolers and umbrellas across sand and other beach surfaces.

BACKGROUND OF THE INVENTION

Carts or wagons are known. For example, Maturo et al., U.S. Pat. No. 3,677,571 discloses a cart having a collapsible tubular frame which attaches to a carrying bag for storing articles therein. A roller connects to the frame with a cylindrical mesh screen attached to the end plates. The frame includes extending arms for accommodating a beach chair. In Abelbeck, et al., U.S. Pat. No. 5,988,671, incorporated by reference hereto, a collapsible cart transports items to the beach or over otherwise yielding terrain. The Abelbeck device comprises a wheeled, collapsible frame including a bottom frame suitable for supporting coolers and the like. Abelbeck also includes an upper frame which supports a pliable receptacle that is of sufficient size to holding miscellaneous items and a retractable chair hanger to support a plurality of folding chairs for transporting the chairs when traveling over rough terrain. The frame collapses to a size that can be easily stored and transported by a stop bracket. The stop bracket is a spring loaded device that allows both locking of the front leg to the distal end of the handle and a pivotal attachment of the front leg to the handle.

Bonewicz et al., U.S. Pat. No. 4,887,837 discloses a carrier for use on beaches. The Bonewicz cart comprises a frame, a pivotable support platform, and at least two wheels. The frame includes a pair of elongated side rail members each having an upper end portion including a handle extending there between and a lower end portion through which an axle passes. The pair of wheels is mounted on the axle. The pivotable support platform comprises a generally planar plastic member having a pair of sides. A pair of pivot rods are provided to establish a horizontal pivot axis. The rods are coupled to the sides of the platform to enable it to be pivoted about that axis from a storage position wherein the platform is substantially flush with the frame to an operative position wherein the platform extends substantially perpendicularly to the frame. The platform includes a pair of cantilever brackets disposed there below and integrally molded therewith. Each of the brackets includes an elongated section having a channel with beads therein and being adapted to snap fit a respective one of the side rails therein to hold the platform in its operative position, whereupon objects can be placed thereon. The platform also comprises at least one support leg pivotably connected, which may be fitted into a beaded channel, thereto to enable the platform to assume a substantially horizontal position for loading it with the objects. The cart also includes an umbrella holder and a hanger for articles or alternatively a large carrying bag may be fitted over and attached to the frame of the cart.

Weldon, U.S. Pat. No. 6,131,925, discloses a beach buddy cart that provides a means to transport items held on the cart platform to a sandy beach location. The beach buddy is provided with a contoured back and foldable seat so that it can serve as a beach chair once at the beach. In addition, retaining rings provide for the secure carrying of a beach umbrella. The carrying platform is supported at both ends when not being moved and is further supported by straps during transit. A pressurized sprayer mounted on the side of the cart back allows fresh water to be easily transported to the beach, warmed, and used to remove salt water and sand both from people and accessories.

Waid, U.S. Pat. No. 7,210,545 discloses a motorized beach cart. A three-wheel motorized cart transports beach related items over sandy terrain. The cart includes a cargo frame for retaining items being transported or stored on the cart. A platform aids in the removal of loose sand from items being loaded and transported. A steering and control handle attached to the rear of the cargo frame contains the electric motor control assembly that operates the electronic circuit utilizing a pulse code modulated speed control trigger and a direction switch. A propulsion assembly containing a rechargeable battery, two motorized front wheels utilizing geared motor assemblies and an electronic motor control circuit. A caster wheel assembly, with a center mounted raised band, is affixed to the rear of the platform to provide the capability to traverse soft sand and easy steering on a hard surface.

The aforementioned devices suffer from various problems in that they are not easily movable through loose sand presently found on many beaches. It is therefore a general object of the present invention to provide an improved beach cart having at least four wheels and a source of power that drives a pair of the wheels to assist a user in transporting the beach cart and items contained therein onto a sandy surface such as a beach. The present beach cart may be collapsible for easy transport in an automobile.

SUMMARY OF THE INVENTION

The present invention is a self-propelled beach cart that comprises a pair of wheels with each being coupled to a pair of drive mechanisms. Each drive mechanism, includes an electric motor operatively coupled to a wheel on a front or rear axel of the cart to create an individual drive unit for a respective side of the axel and create a twin traction axel which propels the beach cart in a desired direction of travel even if one of the tires temporarily loses it grip and momentarily spins. A common power source is coupled to the power input of each motor via a directional control actuation and accelerator switch having a lever actuated by the thumb or finger of the user and a direction control switch. That is, a first motor is coupled to a first tire at one end of either the front or rear axel to independently operate it in a forward or reverse direction depending on the position of the direction control switch. The electricity is routed through the motors in a forward and reverse direction causing the motors to spin the wheels in the same direction and moving the cart in said direction. The second motor is coupled to a second tire that is arranged on the opposite end of the same axel. The arrangement of the twin propulsion sources on the axle creates a cart that will be propelled in a desired direction even when one of the wheels breaks free of the underlying surface and temporarily spins. The user can periodically shift the weight of the cargo from the left side wheels to the right side wheels and walk the cart across a surface of loose material such as sand or gravel. The directional control actuation and accelerator switch includes an output that is coupled to the inputs of the electric motors to direct the electricity in a forward or reverse direction and a slower or faster speed depending upon the position of the accelerator lever of the switch. The switch includes a first position that relates to a forward direction of travel for the cart and a second position that relates to a reverse direction. Control circuitry may be included on the reverse side of the direction control switch that limits the amount of power to the pair of motors when the directional control actuation and accelerator switch is in the reverse position to slow the beach cart when it is being pulled towards the operator to ensure safe operation of the cart. This control circuitry may comprise a resistor that limits the power seen across the motors when in reverse. When the forward direction is selected, electricity is routed into the pair of motors causing the cart to be propelled forward. The speed of the cart may be increased or decreased by simply pushing the accelerator lever over a range of motion. The accelerator lever is spring-biased in an open position such that the cart will stop when the accelerator lever is released. Likewise, when the selector is in the reverse direction, electricity is routed in an opposite direction through the pair of motors and the cart is moved in a reverse or backward direction. The pair of wheels is preferably oversized plastic or rubber tires to easily traverse loose soil and sand.

The electric motors receive energy from a battery source which may be rechargeable via a deployable solar cell or an array of solar cells. The solar cell may be mounted on a portion of the beach cart that is protected when the cart is used to transport beach items across the beach.

In one instance, the beach cart preferably includes a battery compartment and a solar cell compartment. The solar cell is deployed after the cart has delivered the beach items to the beach and the cart has been unloaded. The battery is recharged by solar energy converted by the solar cell or array.

In a first embodiment, the invention comprises a pair of wheels coupled to the electric motors as mentioned previously and driven in a forward or reverse direction. In this first embodiment, the beach cart comprises a rigid frame formed with a cargo compartment for carrying at least beach items. In a second embodiment, the frame of the beach cart is collapsible for easy transport and storage and includes a soft-sided cargo compartment.

It is an object of the invention to provide a cart having a twin traction axel which propels the beach cart in a desired direction of travel even if one of the tires temporarily loses it grip and momentarily spins, by temporarily walking the cart forward in a side-to-side manner.

It is an object of the invention to provide a cart having a directional control actuation and accelerator switch comprising a lever actuated by the thumb or finger of the user to control the acceleration rate of the cart and a direction control switch to control the direction of travel of the cart.

It is an additional object of the invention to provide an electric cart that comprises a first embodiment of the cart having a collapsible frame for transporting the cart in an automobile. The collapsible frame is easily expanded for use in transporting items to locations remote from the automobile. In a second embodiment, the electric cart is formed with a rigid frame.

It is a further object of the invention to teach an improved beach cart The solar cell compartment is deployed after the cart has delivered the beach items to the beach and the cart has been unloaded. The battery is recharged by solar energy converted by the solar cell or array.

These and other objects and advantages of the invention will be set forth, appear in part or become apparent after considering the specification and accompanying drawings. It is to be realized that the following embodiments of the invention have been represented in their simplest form for ease in understanding the invention.

DETAILED DESCRIPTION OF THE INVENTION

Figure 1:
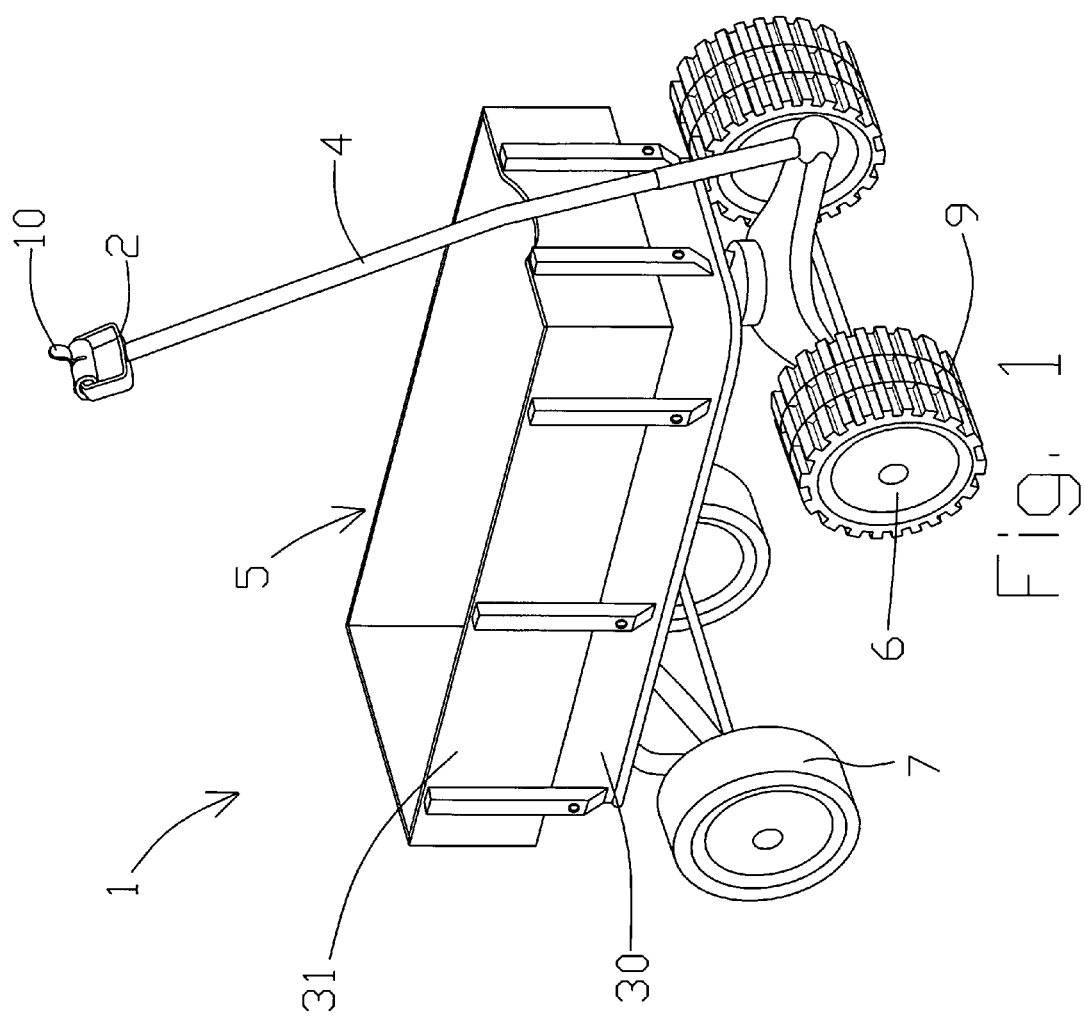
FIG. 1 is a first embodiment of the invention showing a self-propelled electric beach cart.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

FIG. 1 depicts a first embodiment of the invention implemented in a wagon style manner with a horizontal cargo area formed from rigid material. The cart 1 includes a frame 30 having a floor and sidewalls 31 which form a rigid cargo area or receptacle 5. When viewed from above, a footprint of the cargo area is substantially rectangular in shape. A handle 2 connects to a front end of the frame and includes a hand-hold is formed at a free end of the handle opposite the frame. A direction and accelerator switch 10 is mounted onto the hand-hold. The direction and accelerator switch includes a selector switch that toggles between forward and reverse directions as more clearly understood when viewing the electrical switch shown in FIG. 3. In a first position, electricity is flowed through a pair of DC motors 20 that powers a first axel or wheel in a forward direction. For ease in understanding the invention, the DC motors 20 are not shown in FIG. 1. In a second position, electricity is flowed through the DC motors in an opposite direction to propel the wagon in an opposite direction.

Figure 2A:
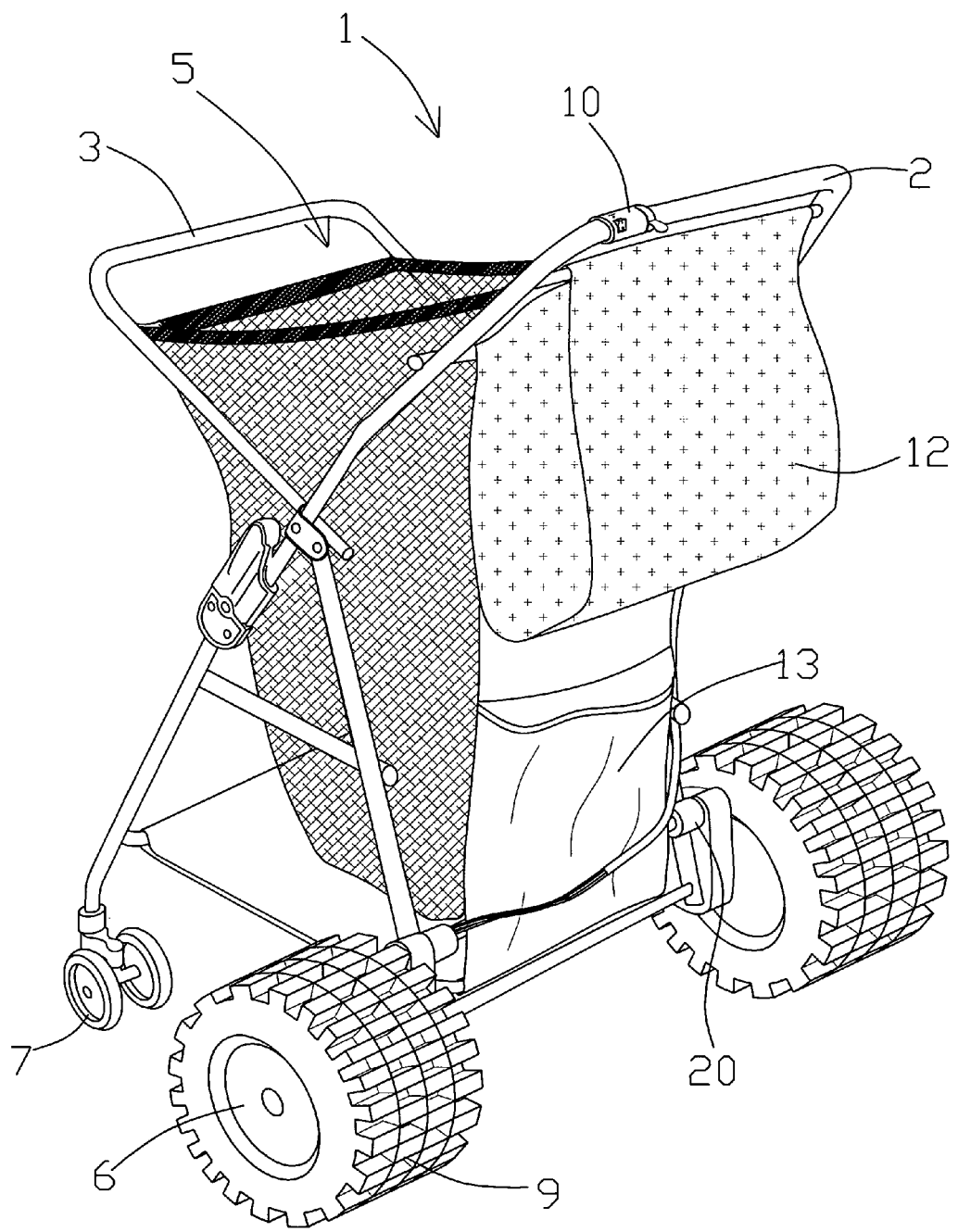
FIG. 2A is a second embodiment of the invention showing a self-propelled cart in an operational state.

FIG. 2A shows a second embodiment of the invention wherein the cart is implemented with a soft-sided vertical cargo area 5 formed from a collapsible material such as cloth, mesh, or netting and resembles a modern baby stroller. That is, a foot print when viewed from above is substantially square in shape. A second smaller storage area 12 for holding keys, wallets and smaller items is arranged on a side of the vertical cargo area directly under handle 2 and extends outward opposite the vertical cargo area 5. A third storage compartment 13 is formed on an outside wall of the vertical cargo area and contains a power source 30 such as a rechargeable battery, not shown in FIG. 2A. A deployable solar cell 25 or an array of solar cells, shown in FIG. 3, may be stored in this compartment and is connected to the rechargeable battery 30. The solar cell 25 operates as a trickle charger for constantly recharging the battery when deployed. In this manner, a user can be assured that the cart will be operational after it has hauled its cargo to the beach.

Figure 2B:
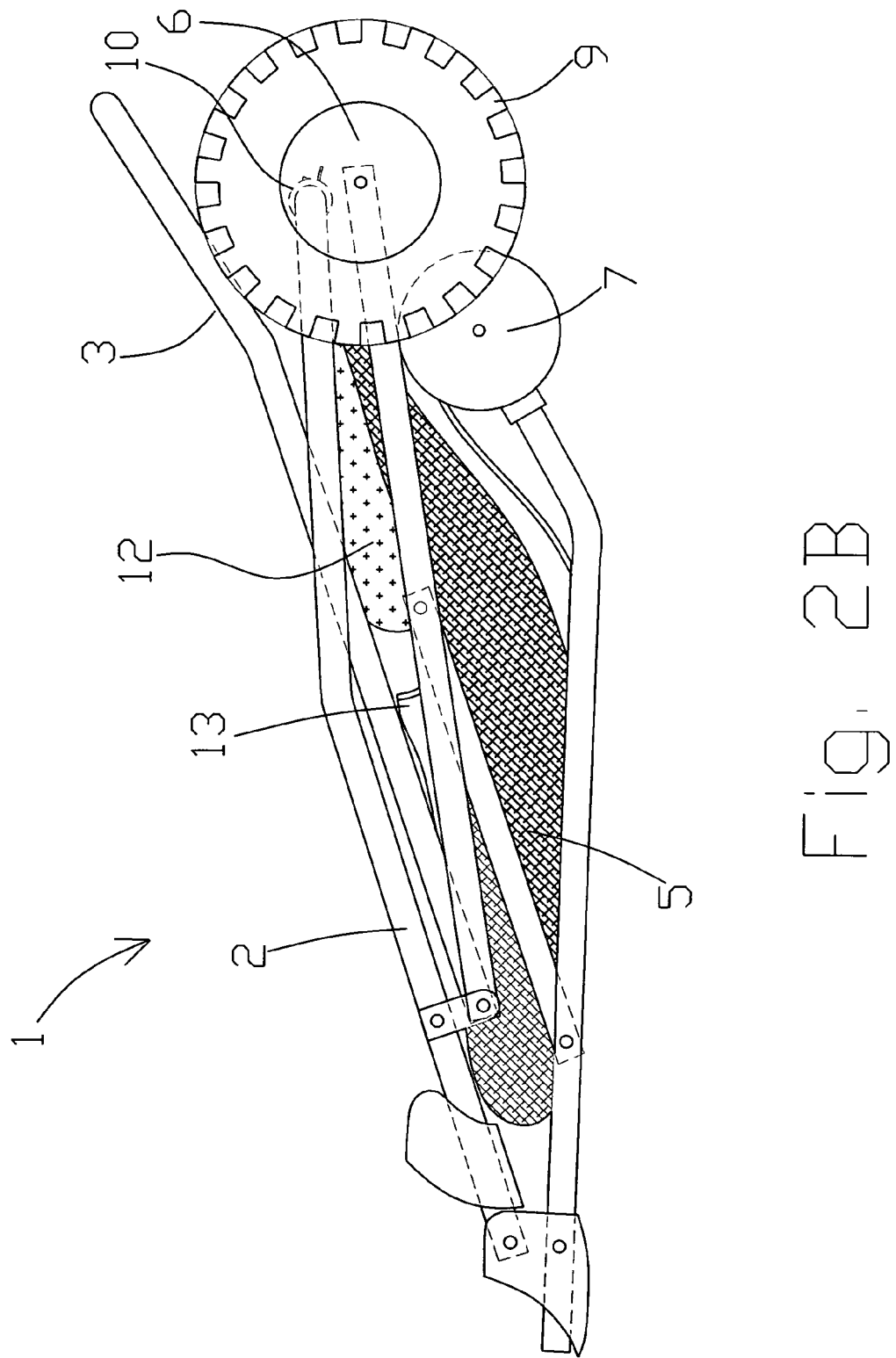
FIG. 2B shows the second embodiment in a collapsed state for transporting the cart in an automobile.

FIG. 2B shows the cart when collapsed, the drive wheels 6 are preferably in fixed orientation with respect to the axel and do not collapse. The driven wheels 7 are nested between within a space defined by the front half of the drive wheels 6 when the device is collapsed, as shown. The wheels are several inches wide and taller than they are wide. Moreover, the wheels are preferably formed from a blown or molded plastic and the drive wheels 6 include rough tread for increasing the rolling friction of the rear wheels on loose soil material. During use, the handle is grasped by the user and the position of the switch is checked to confirm the desired direction of travel. The accelerator lever is then pushed forward from a zero position where no electricity is flowing into the motors to a desired amount of acceleration.

In the second embodiment, the cart 1 has an upper frame that includes a handle 2, which is comprised of a pair of side rails that support a receptacle 5, as described in Abelbeck. The receptacle 5 comprises a mesh material. The pliable nature of the material is useful in that it can collapse when the cart is folded into the collapsed configuration as shown in FIG. 2B.

A direction and accelerator switch 10 includes an acceleration device 11 and a direction control device 12. The acceleration device 11 may comprise a rheostat as shown or other such control circuitry to decelerate and accelerate as desired. A plurality of contacts and wipers comprise the direction control device 12. But, it may is readily apparent to those skilled in the art that other such switch or logic devices may be configured to achieve the results of the direction and accelerator switch 10.

When used, the user confirms that the direction control device 12 is in a correct position and handle 2 is grasped by the user, with the thumb or a finger being arranged on the acceleration device 11, represented as a lever in the included figures. In FIG. 1, the user walks ahead of the cart 1, traversing the direction of travel of the cart by turning the hollow tongue 4. Control wiring from switch 10 is routed through the hollow tongue 4 and outward to the motors 20, not shown in FIG. 1. The motors 20 each include a shaft 20A that may be rotated in a clockwise and counterclockwise direction depending on the direction of flow of electricity through the windings of the motor. The motors thereby operate drive wheels 6 which are equipped with treads 9 for increasing the friction between the drive wheels 6 and sand or other loose soil material. The driven wheels 7 are smooth to reduce the coefficient of friction experienced by them with respect to the material across which they are travelling.

In the first embodiment, the user can swing the handle in a side-to-side direction while pulling the cart 1 when encountering loose soil. This causes the cart 1 to walk across the loose soil. In the second embodiment, the user pushes the cart and may alternate between exerting downward pressure and lifting and opposite side of the handle simultaneously. In this manner, the cart may be advantageously walked across loose sand experienced at the beach without exerting much force. The DC motors, accelerator and direction control switch, and power supply may be provided in a kit that may be retrofitted onto existing beach carts. As can be recognized by FIG. 2B, the cart 1 may be collapsed such that the driven wheels 7 are nested between the drive wheels 6. This collapsible configuration is useful when transporting the cart 1.

Figure 3:
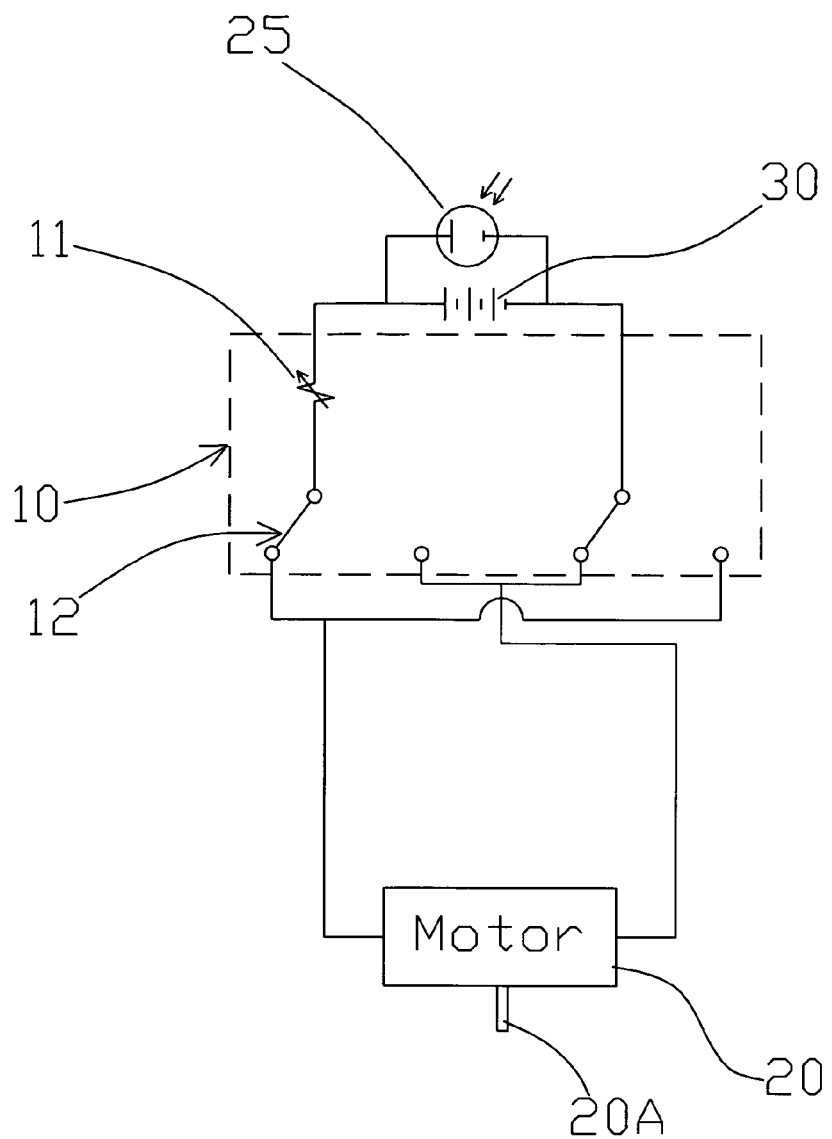
FIG. 3 depicts an electrical schematic showing the drive mechanism of the beach cart including a solar cell for recharging the power supply.

FIG. 3 depicts an electrical schematic showing the drive mechanisms of the beach 1 cart including a solar cell 25 for recharging the power supply 30. As can be recognized, the switch 10 includes a polarity reversal ability coupled to an adjustable rheostat 11 which is biased towards a maximum resistance. An operator toggles the accelerator lever to reduce the resistance and allow more voltage from the power source to be applied across the pair of motors. As the accelerator lever is pushed towards an absolute open position, the speed of the beach cart increases. The speed is decreased when the lever is released and reassumes the open position that corresponds to the maximum resistance of the rheostat. It should be noted that other types of circuits and computer logic may be realize in implementing the invention.

While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A collapsible motorized beach cart comprising:
   a frame having a transporting compartment in which beach items are stored and a handle, said transporting compartment being formed from a collapsible material;
   a first storage area being smaller in size than the transporting compartment and arranged on a side of the transporting compartment directly beneath the handle to extend outward opposite the transporting compartment;
   a second storage compartment formed on the transporting compartment;
   a pair of drive wheels arranged on an end of the cart fixed at opposite ends of an axel, said drive wheels comprising treads being arranged on an exterior surface thereon;
   a pair of driven wheels arranged on an end of the cart opposite the drive wheels, said driven wheels having a exterior surface that is smooth;
   a pair of motors mounted on said frame, each motor including a shaft that can rotate in a clockwise and counter-clockwise direction, the shaft of one motor being coupled to one of the drive wheels for turning that drive wheel in a clockwise or counter-clockwise direction to propel the motorized beach cart in a forward or backward direction, the shaft of the other motor being coupled to the other of the drive wheels for turning it in a clockwise or counter-clockwise direction to propel the motorized beach cart in a forward or backward direction such that both motors are simultaneously operated;
   an accelerator mounted on the handle and comprising a lever actuated to control the acceleration rate of the collapsible motorized beach cart and a direction control switch to control the direction of travel of the cart coupled to the pair of motors, said direction control switch having a first and second position, when in the first position the shafts of the pair of motors move in a clockwise direction and when in the second position the shafts of the pair of motors move in a counter-clockwise direction; and,
   a power source connected to the pair of motors through the accelerator and said power source being arranged within said second storage compartment.

2. The motorized beach cart of claim 1 wherein the accelerator is a rheostat coupled to a lever actuated by a user's thumb or finger, said lever being biased towards a position that corresponds to no power flowing into either motor.

3. The motorized beach cart of claim 1 wherein the transporting compartment includes mesh.

4. The motorized beach cart of claim 1 wherein a magnitude of power delivered to the pair of motors is increased or decreased according a range of motion of the accelerator, at a first end of said range of motion no power is delivered to the pair of motors and when the accelerator is biased towards the second position the amount of power to the pair of motors is increased.

5. The motorized beach cart of claim 1 wherein said power source is a rechargeable battery.

6. The motorized beach cart of claim 1 wherein said frame is collapsible such that the driven wheels are arranged between the drive wheels when in a collapsed state.

7. The motorized beach cart of claim 1 further comprising at least one solar cell which recharges the power source.

8. The motorized beach cart of claim 1 wherein said drive wheels are formed from plastic.

9. A motorized beach cart comprising:
   a collapsible frame having a transporting compartment in which beach items are stored and a handle;
   a pair of drive wheels arranged on an end of the cart and at opposite ends of an axel, said drive wheels comprising treads being arranged on an exterior surface thereon;
   a pair of driven wheels arranged on an end of the cart opposite the drive wheels, said driven wheels having a exterior surface that is smooth, and the driven wheels are arranged between the drive wheels when in a collapsed state;
   a pair of motors mounted on said frame, each motor including a shaft that can rotate in a clockwise and counter-clockwise direction, the shaft of one motor being coupled to one of the drive wheels for turning that drive wheel in a clockwise or counter-clockwise direction to propel the motorized beach cart in a forward or backward direction, the shaft of the other motor being coupled to the other of the drive wheels for turning it in a clockwise or counter-clockwise direction to propel the motorized beach cart in a forward or backward direction such that both motors are simultaneously operated;
   an accelerator mounted on the handle and coupled to the pair of motors, said accelerator having a first and second position, when in the first position the accelerator causes the shafts of the pair of motors to move in a clockwise direction and when in the second position the accelerator causes the shafts of the pair of motors to move in a counter-clockwise direction; and,
   a power source connected to the pair of motors through the accelerator
   wherein the pair of drive wheels are fixed at opposite ends of an axel and do not collapse and the driven wheels are nested within a space defined by the front half of the drive wheels when the motorized beach cart is collapsed and, wherein the accelerator includes a lever actuated by a user's thumb or finger, said lever being biased towards a position that corresponds to no power flowing into either motor.

10. The motorized beach cart of claim 9 wherein the transporting compartment includes mesh.

11. The motorized beach cart of claim 9 wherein a magnitude of power delivered to the pair of motors is increased or decreased according a range of motion of the accelerator, at a first end of said range of motion no power is delivered to the pair of motors and when the accelerator is biased towards the second position the amount of power to the pair of motors is increased.

12. The motorized beach cart of claim 9 further comprising a second transporting compartment arranged directly under the handle of the frame.

13. The motorized beach cart of claim 12 further comprising a compartment arranged under said second transporting compartment and into which said power source is deposited.

14. The motorized beach cart of claim 9 wherein said power source is a rechargeable battery.

15. The motorized beach cart of claim 9 further comprising at least one solar cell which recharges the power source.

* * * * *